United States Patent [19]

Senga et al.

[11] Patent Number: 4,513,698
[45] Date of Patent: Apr. 30, 1985

[54] INTAKE MANIFOLD STRUCTURE FOR INTERNAL COMBUSTION ENGINES

[75] Inventors: Akihisa Senga; Yoshiaki Hidaka; Tadashi Tsuchiyama, all of Saitama, Japan

[73] Assignee: Honda Giken Kogyo Kabushiki Kaisha, Tokyo, Japan

[21] Appl. No.: 368,983

[22] Filed: Apr. 16, 1982

[30] Foreign Application Priority Data

May 20, 1981 [JP] Japan ................. 56-76043

[51] Int. Cl.³ .................................. F02M 35/00
[52] U.S. Cl. ........................ 123/52 MV; 123/432; 123/545; 123/590
[58] Field of Search ............ 123/52 M, 52 MV, 306, 123/308, 432, 545, 546, 547, DIG. 7, 590

[56] References Cited

U.S. PATENT DOCUMENTS

| | | | |
|---|---|---|---|
| 2,936,746 | 5/1960 | Rundquist | 123/547 |
| 2,988,068 | 6/1961 | Waydak | 123/41.1 |
| 3,492,978 | 2/1970 | Baster | 123/52 M |
| 3,915,128 | 10/1975 | Rich | 123/52 MV |
| 3,916,850 | 11/1975 | Date et al. | 123/52 M |
| 3,994,129 | 11/1976 | Sakurai et al. | 123/52 MV |
| 4,094,283 | 6/1978 | Sutton | 123/547 |
| 4,108,123 | 8/1978 | Nakagawa et al. | 123/52 M |
| 4,198,947 | 4/1980 | Rassey | 123/DIG. 7 |
| 4,348,997 | 9/1982 | Takeda et al. | 123/590 |

Primary Examiner—Craig R. Feinberg
Assistant Examiner—David A. Okonsky
Attorney, Agent, or Firm—Lyon & Lyon

[57] ABSTRACT

An improved intake manifold structure for internal combustion engines includes a distribution chamber having an upper sub-chamber leading to a carburetor and a lower sub-chamber communicating with the upper sub-chamber through a communication hole. A plurality of branch passages extend from the lower sub-chamber to a plurality of combustion chambers. An air-fuel mixture fed from the carburetor to the distribution chamber is expanded successively in two steps to promote its atomization as it passes through the two sub-chambers, thus improving uniform distribution of the mixture to the respective branch passages. Engine exhaust gas is returned to the upper sub-chamber to further promote the atomization of the mixture.

25 Claims, 11 Drawing Figures

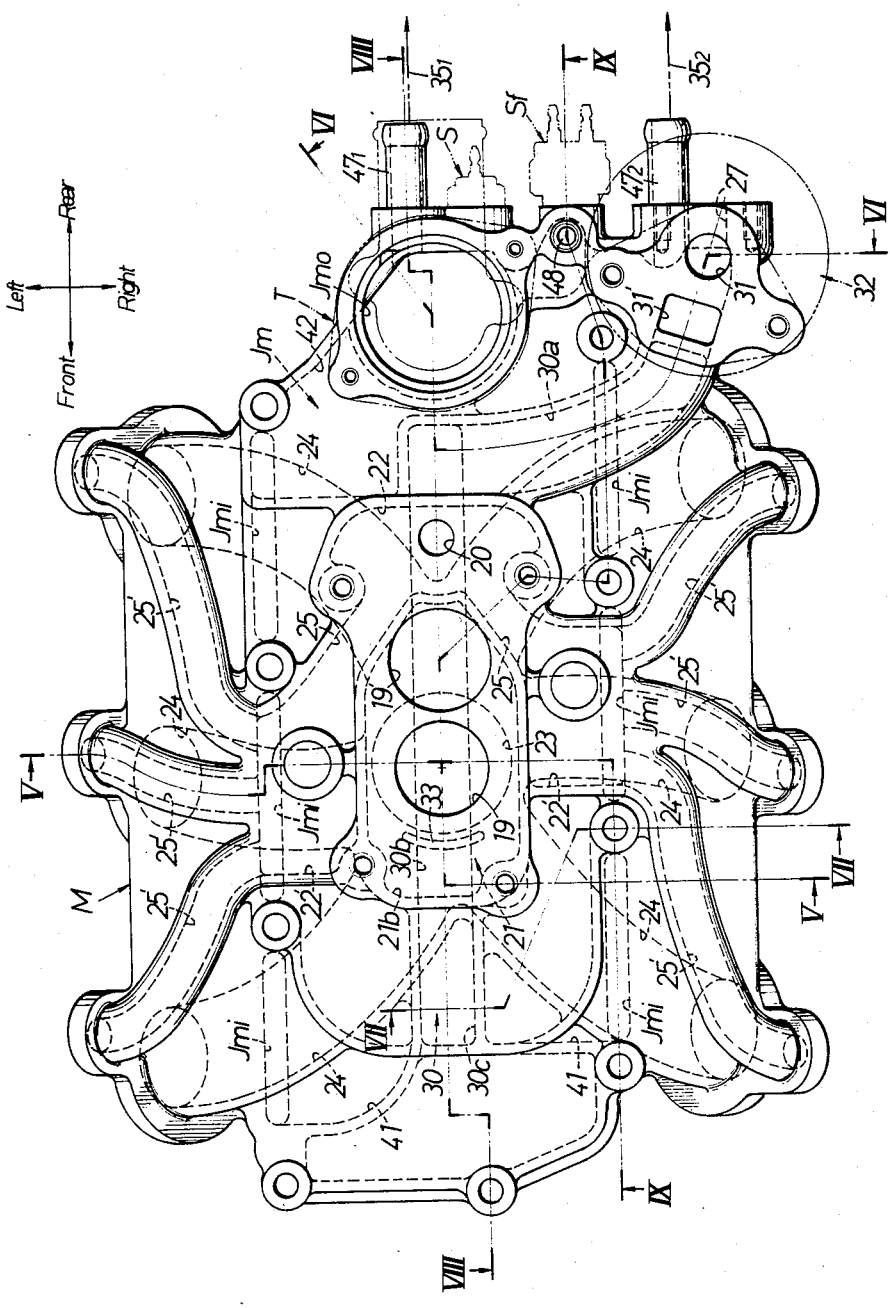

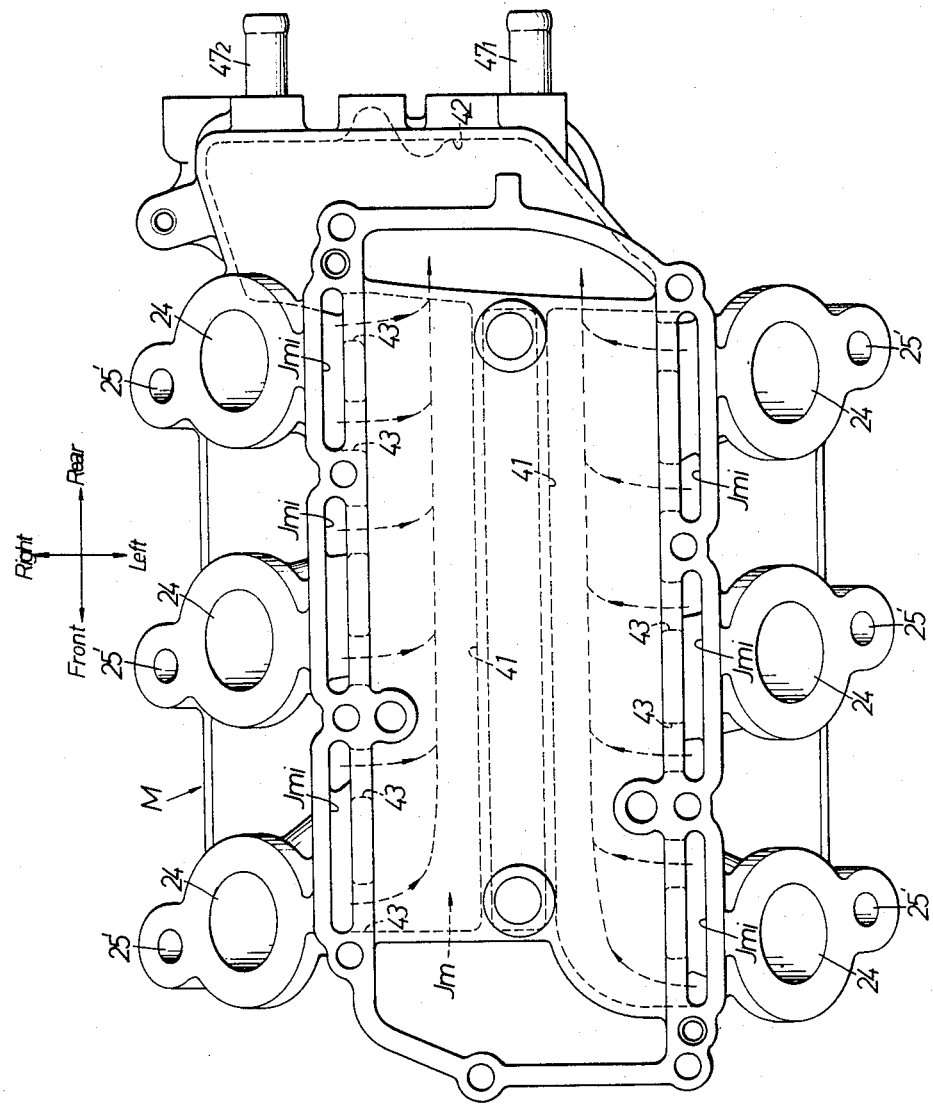

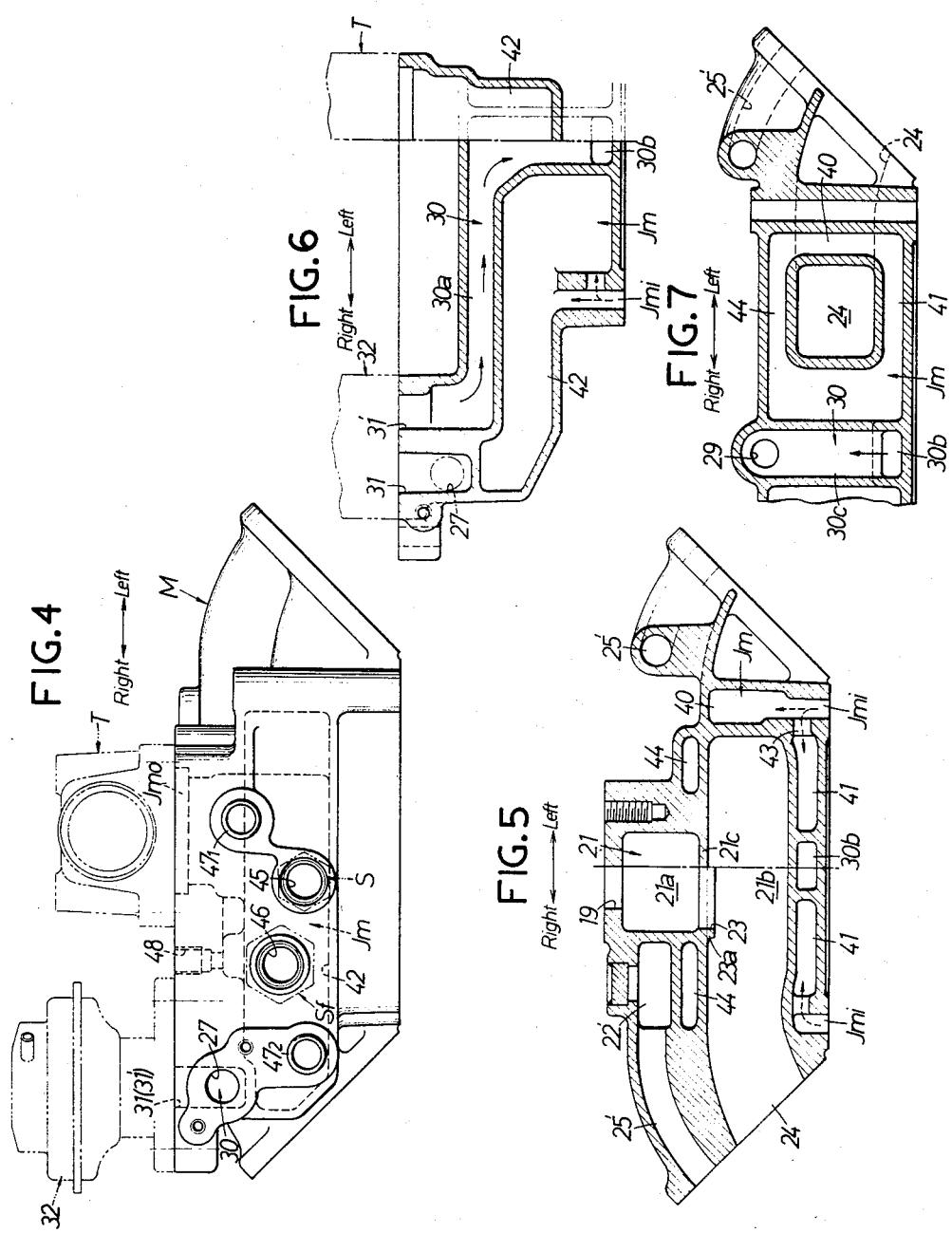

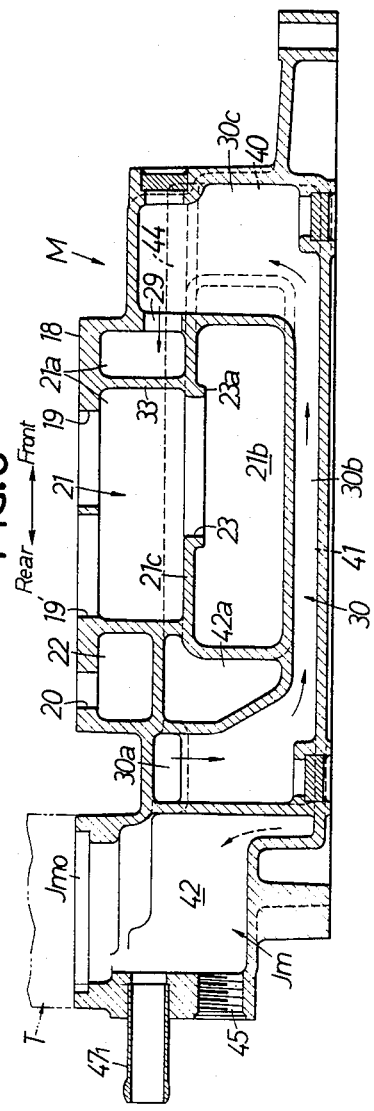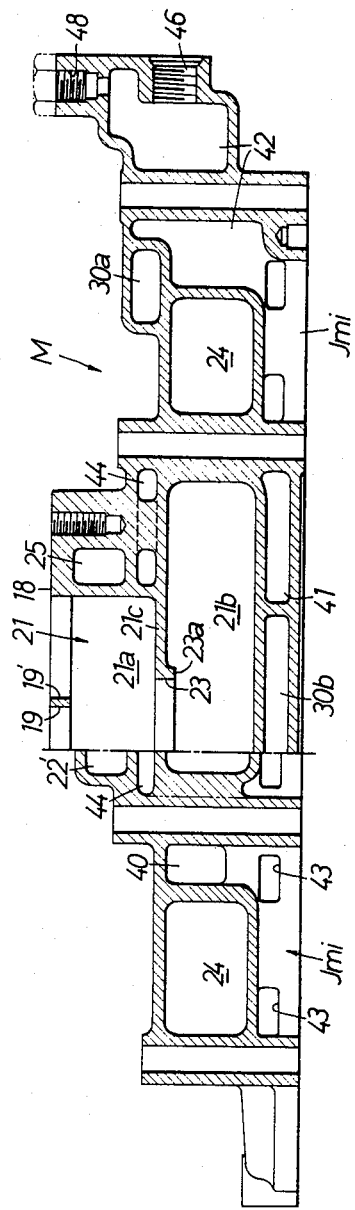

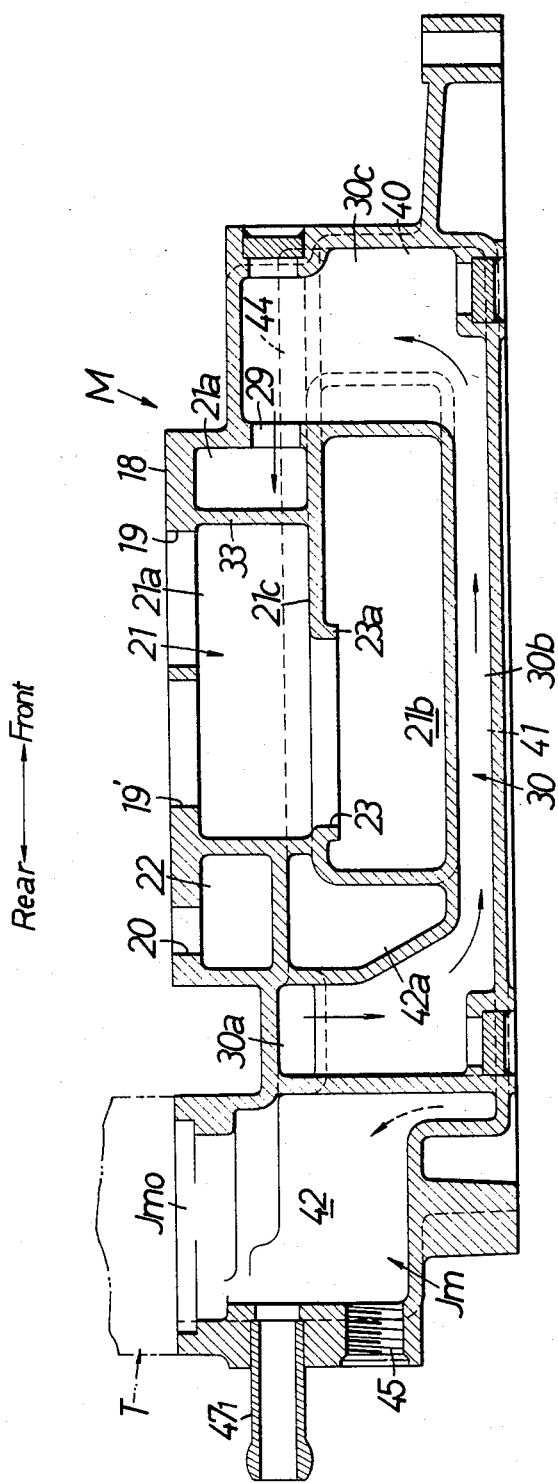

INTAKE MANIFOLD STRUCTURE FOR INTERNAL COMBUSTION ENGINES

BACKGROUND OF THE INVENTION

1. Field of the Invention

The present invention relates to an intake manifold structure for an internal combustion engine, which structure is equipped with both a distribution chamber for receiving an air-fuel mixture provided by a carburetor, as well as a plurality of branch passages which extend from that distribution chamber for distributing that mixture into a plurality of combustion chambers of an internal combustion engine.

2. Description of the Prior Art

The intake manifold structure according to the prior art has a single distribution chamber having an insufficient capacity, and consequently atomization of the fuel in the mixture is so poor as to allow the fuel to flow in the form of large fuel droplets into the combustion chambers such prior art construction makes it remarkably difficult to effect the uniform distribution of the mixture because of the interferences in intake air among the respective combustion chambers. Especially, in case a compound carburetor having primary and secondary bores is used, the uniform distribution of the mixture into the respective combustion chambers is made further difficult additionally because of the differences among the distances from the primary and secondary bores to the respective branch passages.

SUMMARY OF THE INVENTION

It is, therefore, an object of the present invention to provide an intake manifold structure of the aforementioned kind, in which the main distribution chamber is constructed of upper and lower sub-chambers communicating with each other through a communication passage so that an air- fuel mixture from a carburetor may be expanded, when it flows through the two sub-chambers, to promote its atomization thereby to eliminate the defects concomitant with the prior art.

Another object of the present invention is to improve the distribution of the mixture into the respective, branch passages as well as to effectively promote the atomization of the mixture by introducing engine exhaust gas into the upper sub-chamber through an exhaust recirculation passage, thereby to warm the mixture.

If, in this case, the temperature of the exhaust gas to be recirculated into the main distribution chamber is excessively high, the fuel wetting the inner wall of the main distribution chamber is undesirably carbonized when it is contacted by that hot exhaust gas.

Therefore, still another object of the present invention is to make it possible to effectively lower the temperature of the recirculated exhaust gas by making the exhaust recirculation passage so long as to underlie the bottom wall of the distribution chamber.

A primary auxiliary distribution chamber, which is to be fed with the rich mixture from the auxiliary carburetor, is positioned at one longitudinal side of the main distribution chamber, which is to be fed with the lean mixture from the main carburetor. A pair of secondary auxiliary distribution chambers, which communicate with the primary auxiliary distribution chamber, are positioned at both the right and left sides of the main distribution chamber. In this way the rich mixture may be distributed from the respective secondary auxiliary distribution chambers into the auxiliary combustion chambers of the same cylinder bank.

Especially in the case of a V-type multi-cylinder internal combustion engine having two banks of cylinders arranged in the shape of a letter "V", the uniform distribution of the rich mixture into the respective auxiliary combustion chambers is hindered and made more difficult by the distribution passages of the lean mixture.

Therefore, a further object of the present invention is to provide an intake manifold structure for an internal combustion engine, which is able to overcome the aforementioned difficulty.

According to the present invention, the difficulty can be overcome by arranging both a primary auxiliary distribution chamber and a pair of secondary auxiliary distribution chambers the latter being fed with the rich mixture from the auxiliary carburetor, at one longitudinal side of the main distribution chamber, which is to be fed with the lean mixture from the main carburetor. The pair of secondary auxiliary distribution chambers communicate with the primary auxiliary distribution chamber at both the right and left sides of the main distribution chamber so that the rich mixture may be distributed from the respective secondary auxiliary distribution chambers into the auxiliary combustion chambers of the same side cylinder row.

An attendant object of the present invention is to provide an intake manifold structure of the aforementioned kind for an internal combustion engine, which is able to effectively promote the atomization of the mixture in the intake manifold by warming the intake manifold with the use of the warm coolant after it has cooled down the engine, which warm coolant is readily available.

The above and other objects, features and advantages of the present invention will become apparent from the following detailed description of a few preferred embodiments of the present invention when taken in conjunction with the accompanying drawings.

BRIEF DESCRIPTION OF THE DRAWINGS

FIG. 2 is a top plan view showing that intake manifold structure;

FIG. 3 is a bottom plan view showing the same;

FIG. 4 is a rear elevation showing the same;

FIG. 5 is a section taken along line V—V of FIG. 2;

FIG. 6 is a section taken along line VI—VI of the same Figure;

FIG. 7 is a section taken along line VII—VII of the same Figure;

FIG. 8 is a section taken along line VIII—VIII of the same Figure;

FIG. 9 is a section taken along line IX—IX of the same Figure;

FIG. 11 is a similar section to FIG. 8 but shows a modification of the intake manifold structure according to the present invention.

DESCRIPTION OF THE PREFERRED EMBODIMENTS

Figure 1:
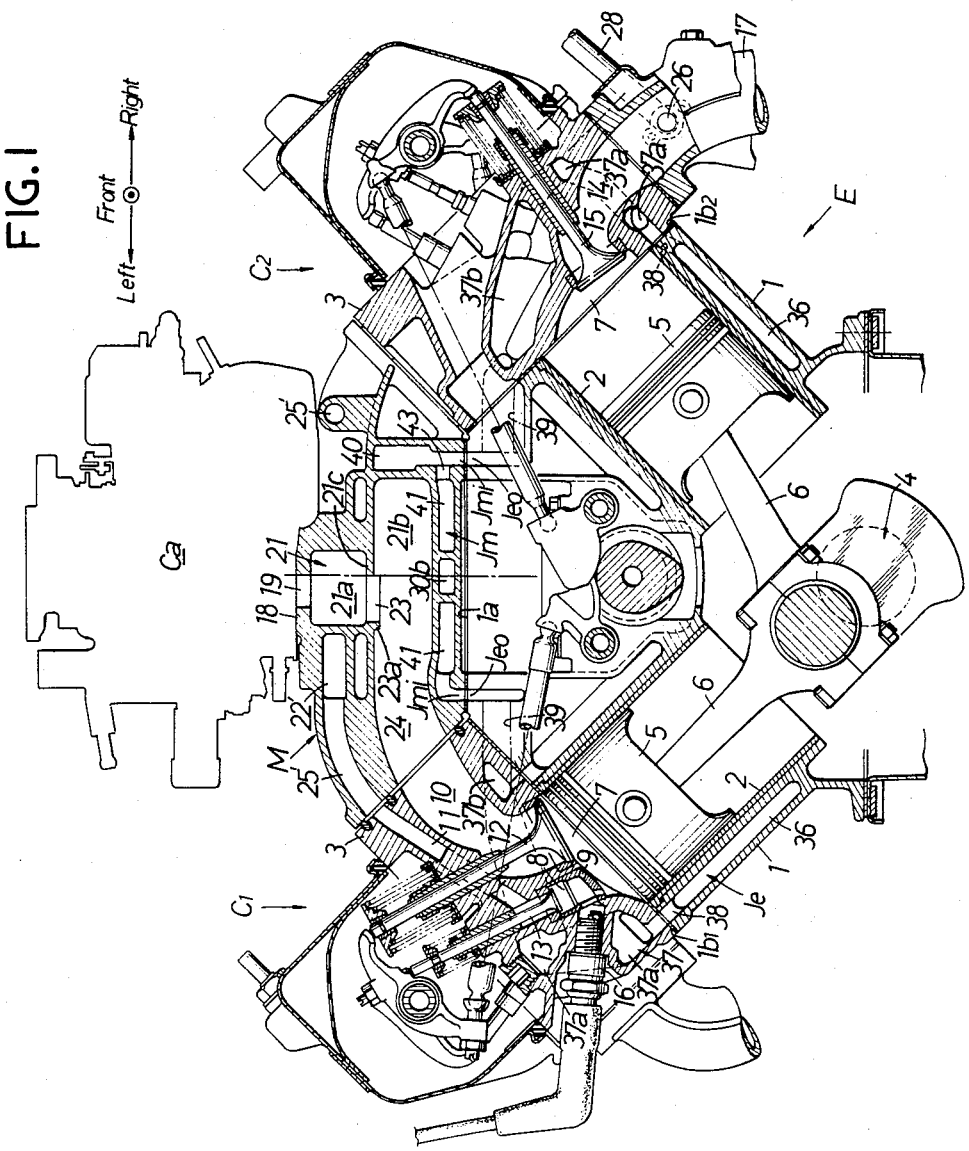
FIG. 1 is a cross-sectional front elevation showing a V-type six-cylinder internal combustion engine which is equipped with an intake manifold structure according to one embodiment of the present invention.

The present invention will now be described in connection with one embodiment thereof with reference to the accompanying drawings. In FIG. 1, reference letter E indicates a V-type six-cylinder internal combustion engine which has two banks of left and right cylinders $C_1$ and $C_2$ arranged in the shape of a letter "V". The cylinder block 1 of that engine has its upper surface formed into a horizontal surface 1a at its center portion and into roof-shaped inclined surfaces $1b_1$ and $1b_2$ at its left and right side portions, respectively. The cylinder banks $C_1$ and $C_2$ have their respective three cylinders 2 opened at their upper ends into those inclined surfaces $1b_1$ and $1b_2$ and their respective cylinder heads 3 jointed to the same surfaces $1b_1$ and $1b_2$, respectively. Also, an intake manifold M is jointed to the horizontal surface 1a such that both its right and left sides are jointed to the inner surfaces of the right and left cylinder heads 3, respectively. Moreover, a carburetor Ca is mounted on the upper surface of the intake manifold M.

To a common crankshaft 4 which is mounted on the lower surface of the cylinder block 1, there are connected through connecting rods 6, respectively, pistons 5 which are made operative to slide up and down in the respective cylinders 2.

Each of the cylinder heads 3 is formed with a main combustion chamber 7, which is defined by the corresponding piston 5, an auxiliary combustion chamber 8 which has communication with said chamber 7 through a torch nozzle 9, a main intake port 10 and an exhaust port 14 which are respectively opened into the main combustion chamber 7, and an auxiliary intake port 11 which is opened into the auxiliary combustion chamber 8. The main intake port 10, the auxiliary intake port 11 and the exhaust port 14 are opened and closed by means of a main intake valve 12, an auxiliary intake valve 13 and an exhaust valve 15, respectively. An ignition plug 16, which is threaded in the cylinder head 3, has its electrode facing the corresponding auxiliary combustion chamber 8.

The aforementioned carburetor Ca is enabled to simultaneously supply a lean main mixture, and an auxiliary rich mixture. Of these, the carburetor portion for supplying the main mixture is of the compound type, having primary and secondary bores. Moreover, the aforementioned main and auxiliary mixtures are distributed through the intake manifold into the main and auxiliary intake ports 10 and 11, respectively.

Thus, in each cylinder 2, when the main and auxiliary intake valves 12 and 13 are opened during the suction stroke of the corresponding piston 5, the main mixture is drawn through the main intake port 10 to the main combustion chamber 7, whereas the auxiliary mixture is drawn through the auxiliary intake port 11 to the auxiliary combustion chamber 8. Then, near the end of the subsequent compression stroke, the rich mixture in the auxiliary combustion chamber 8 is ignited by the ignition plug 16, and the resultant torch flame propagates through the torch nozzle 9 into the main combustion chamber 7 thereby to ignite and burn the lean mixture in said chamber 7. As a result, the lean mixture having an overall high air-fuel ratio can be burned. Near the end of the expansion stroke of the piston 5 the exhaust valve 15 is opened for the subsequent exhaust stroke, the exhaust gasses passing through the exhaust port 14 and further to one of the exhaust pipes 17.

Next, the following description is directed to the passages of the aforementioned main and auxiliary mixtures through the intake manifold M. FIG. 2 is a top plan view of the intake manifold M, in which the upper portion is located at the lefthand side of the engine E, i.e., the side of the cylinder bank $C_1$ whereas the lower portion is located at the righthand side of the same, i.e., at the side of the cylinder bank $C_2$ and in which the lefthand portion is located in front of the engine E whereas the righthand portion is located at the rear of the same.

In the upper end surface of that intake manifold M, i.e., a carburetor mounting surface 18 thereof, there are opened primary and secondary main inlets 19 and 19', which communicate with the primary and secondary bores for supplying the main lean mixture from the aforementioned carburetor Ca, respectively, and auxiliary inlet 20, which communicates with the auxiliary bore for supplying the auxiliary rich mixture from the same carburetor Ca, such that the primary and secondary inlets 19 and 19' and the auxiliary inlet 20 are arranged in the longitudinal direction of the engine E, i.e., in the axial direction of the crankshaft 4. Just below both the main inlets 19 and 19', there is disposed a plenum distribution chamber 21 which communicates therewith. Just below the auxiliary inlet 20, on the other hand, there is disposed a primary auxiliary distribution chamber 22 which communicates therewith. The main distribution chamber 21 is composed of an upper sub-chamber 21a and a lower sub-chamber 21b having a larger capacity than that of the sub-chamber 21a. From each of the two side walls of that lower sub-chamber 21b, there extend three main branch passages 24 which lead to the main intake ports 10 of the corresponding one of the cylinder banks $C_1$ and $C_2$, respectively. A partition 21c partitioning the upper and lower sub-chambers 21a and 21b of the main distribution chamber 21 is formed with a communication passage 23 which provides communication between the two sub-chambers 21a and 21b.

Thus, the main mixture supplied by the carburetor Ca flows from the main inlets 19 or 19' into the upper sub-chamber 21a of the main distribution chamber 21 and then through the communication passage 23 into the lower sub-chamber 21b. The lean mixture is then distributed into the plural main branch passages 24 until it is drawn into the respective main intake ports 10, as has been described hereinbefore. Since the main mixture introduced into the main distribution chamber 21 flows in that way through the two upper and lower sub-chambers 21a and 21b, the atomization of the fuel in the mixture is highly promoted by the respective expanding actions and by the warming operation of the chamber walls. At the same time, moreover, the pulsations of the intake air in the respective combustion chambers are attenuated by the two upper and lower sub-chambers 21a and 21b so that the interference in the intake air among the respective combustion chambers can be remarkably reduced.

In the description thus far made, the effective cross-sectional area of the communication passage 23 is made larger than the sum of the effective cross-sectional areas of the primary and secondary main inlets 19 and 19'. As a result, the communication passage 23 raises little resistance to the intake air even during the high speed running operation in which the engine is fed with the lean mixture from both the primary and secondary bores of the carburetor Ca. Moreover, the communication passage 23 has its lower end formed with an annular protruding edge 23a which protrudes into the lower sub-chamber 21b. The annular protruding edge 23a functions to blow away any liquid fuel, which flows down on the circumferential wall of the communication passage 23, with the sucking action promoting the atomization of that liquid fuel and to guide the main mixture, which flow from the upper sub-chamber 21a to the lower sub-chamber 21b, in a manner to impinge upon the bottom wall of the lower sub-chamber 21b. That bottom wall is heated by a later-described water jacket Jm, thereby to further promote the atomization of that fuel. As is shown in FIGS. 1, 2 and 8, moreover, the communication passage 23 is arranged generally coaxially with the primary main inlet 19. As a result, since, in this case, the flow resistance between the primary bore of the carburetor Ca leading to the primary main inlet 19 and the communication passage 23 is low, especially the light load operation of the engine can be improved. It will be apparent in view of FIG. 11 that the high speed operation of the engine can be improved if the communication passage 23 is arranged generally coaxially with the secondary main inlet 19'. Moreover, the lower sub-chamber 21b of the main distribution chamber 21 is disposed at the center portion between both the left and right cylinder banks $C_1$ and $C_2$, so that the main branch passages 24 leading from the lower sub-chamber 21b can be made to have an equal length for the left cylinder bank $C_1$ and for the right cylinder bank $C_2$, thereby to achieve uniform distribution of the mixture between both the cylinder rows $C_1$ and $C_2$.

At the rear of and adjacent to the upper sub-chamber 21a of the main distribution chamber 21, there is arranged the primary auxiliary distribution chamber 22 having two right and left side walls, from which two primary auxiliary branch passages 25 extend. These branch passages 25 communicate with a pair of secondary auxiliary distribution chambers 22' which are arranged adjacent to both the right and left sides of the upper sub-chamber 21a of the main distribution chamber 21. From each of the outer walls of the respective secondary auxiliary distribution chambers 22', there extend three secondary auxiliary branch passages 25' which lead to the auxiliary intake ports 11 of each of the cylinder banks $C_1$ and $C_2$.

As a result, the rich auxiliary mixture furnished by the carburetor Ca flows from the auxiliary inlet 20 into the primary auxiliary distribution chamber 22 and is distributed from said chamber 22 through the two primary auxiliary branch passages 25. The rich auxiliary mixture then flows into the left and right secondary auxiliary distribution chambers 22' and then it is further distributed into the plural secondary auxiliary branch passages 25' until it is drawn into the respective auxiliary intake ports 11, as has been described hereinbefore.

Reverting to FIGS. 1 and 2, the exhaust pipe 17 is formed with an exhaust outlet 26 at one side, and the intake manifold M is formed with an exhaust inlet 27 at its rear surface. The outlet 26 and inlet 27 are connected through an exhaust recirculation pipe 28.

As shown in FIGS. 2, 4, 5, 6, 7 and 8, the intake manifold M is formed in its wall with an exhaust recirculation passage 30 which provides communication between the exhaust inlet 27 and an exhaust outlet hole 29 opened into the front wall of the upper sub-chamber 21a of the aforementioned main distribution chamber 21. As a result, the exhaust recirculation passage 30 has its upstream end terminating at the exhaust inlet 27 and its downstream end terminating at the exhaust outlet hole 29. The exhaust recirculation passage 30 is composed of an intermediate portion 30b, which longitudinally crosses in a horizontal direction just below the main distribution chamber 21, an upstream portion 30a, which descends from the exhaust inlet 27 toward the rear end of that intermediate portion 30b, and a downstream portion 30c which ascends from the front end of the intermediate portion 30b toward the exhaust outlet hole 29. That upstream portion 30a has a midway opening at 31 and 31' in the upper surface of the intake manifold M. An exhaust recirculation control valve 32 is so mounted in the intake manifold M as to connect those openings 31 and 31'. As shown in FIGS. 2 and 8, a baffle plate 33 facing the exhaust outlet hole 29 is disposed to rise in the upper sub-chamber 21a of the main distribution chamber 21.

Thus, during the operation of the engine E, a portion of the exhaust gas flowing through the exhaust pipe 17 flows from the exhaust outlet 26 through the exhaust recirculation pipe 28 and further through the exhaust inlet 27 into the exhaust recirculation passage 30, and is controlled to such a flow rate by the action of the control valve 32 as is suitable for the operating state of the engine until it flows from the exhaust outlet hole 29 into the upper sub-chamber 21a of the main distribution chamber 21. The exhaust gas thus having passed into the upper sub-chamber 21a instantly impinges upon the baffle plate 33 so that it is separated to the right and left and mixed into the main mixture flowing through the main distribution chamber 21. The exhaust gas as thus further mixed flows into the lower sub-chamber 21b thereby to promote the extent of mixing with the main mixture. Since, in the meanwhile, the exhaust gas is still at a higher temperature than the main mixture, it directly warms the main mixture, thereby promoting the atomization thereof. Thus, the exhaust gas is distributed together with the lean main mixture into the respective main intake ports 10 through the main branch passages 24 until it is recirculated to the main combustion chambers 7. The exhaust gas as thus recirculated depresses the excessive rise of the combustion temperature of the mixture, while this mixture is being burned, thereby playing a role to decrease the emission of nitrogen oxides.

Figure 10:
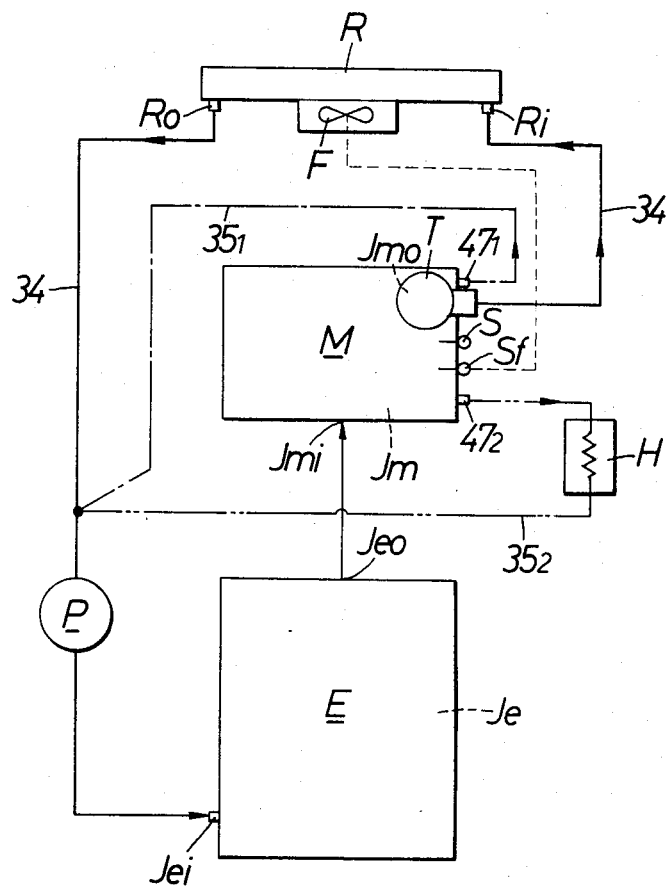
FIG. 10 is a circuit diagram of engine coolant.

The engine E and the intake manifold M are equipped with water jackets Je and Jm for warming their respective mixtures, and the coolant circuits of these water jackets will now be descirbed with reference to FIG. 10.

Into the main coolant passage 34 leading out of the outlet Ro of a radiator R and returning to the inlet Ri of the same, there are incorporated in the flow direction from the upstream a coolant pump P, the water jacket Je of the internal combustion engine E and the water jacket Jm of the intake manifold M, all of which are sequentially connected in series. The coolant pump P is mechanically driven by the engine E to pump the coolant out of the outlet Ro of the radiator R and to pump the same into the water jacket Je. To the outlet Jmo of the water jacket Jm of the intake manifold M, there is attached a thermostat T which is made operative to be opened when the temperature in the water jacket Jm exceeds a predetermined level.

From the water jacket Jm of the intake manifold M, there extend first and second bypass coolant passages $35_1$ and $35_2$ which are connected to the main coolant passage 34 between the outlet Ro of the radiator R and the coolant pump P. A warming heat exchanger H for the interior of the automobile is interposed in the second bypass coolant passage $35_2$.

To the intake manifold M, moreover, there are attached both a temperature sensitive switch Sf, which is made operative to operate the cooling electric fan F of the radiator R when it senses that the coolant temperature in the water jacket Jm of the intake manifold M rises to a higher level than a predetermined value, and a temperature sensor S which operates a heat indicator (not shown) in response to the change in the same coolant temperature. Incidentally, reference letters Jei, Jeo and Jmi appearing in the accompanying drawings indicate the inlet and outlet of the water jacket Je and the inlet of the water jacket Jm, respectively.

Thus, when the engine E operates at a low temperature, the thermostat T closes to shut off the outlet Jmo of the water jacket Jm of the intake manifold M. As a result, the coolant pumped out by the pump P is first fed to the water jacket Je of the engine E and then to the water jacket Jm of the intake manifold M. After that, the coolant is shunted to the first and second bypass coolant passages $35_1$ and $35_2$ so that it bypasses the radiator R and merges at the main coolant passage 34 downstream of the radiator R until it passes into the pump P. The circulation thus far described is repeated. As a result, the coolant in the main coolant passage 34 does not pass through the radiator R thereby to have little chance of heat liberation so that its temperature can be promptly raised in accordance with the heat generation of the engine E. This promotes the warming-up of the engine E and the temperature rise in the intake manifold M. Then, if the temperature in the water jacket Jm exceeds the predetermined level so that the thermostat T is opened, the coolant having passed through the water jacket Jm mostly leaves the outlet Jmo having little flow resistance until it enters the inlet Ri of the radiator R so that it liberates its heat while passing through the radiator R. The remaining portion of the coolant takes the course to the first and second bypass passages $35_1$ and $35_2$, as has been described hereinbefore. Moreover, if the temperature in the water jacket Jm is raised so that the temperature sensitive switch Sf is closed, the electric fan F operates to promote the heat liberation in the radiator R. Thus, the coolant pumped out of the pump P wholly passes sequentially through the water jackets Je and Jm at all times thereby to control the engine E and the intake manifold M to proper temperature levels.

Next, the constructions of the water jackets Je and Jm are described as follows:

First of all, the water jacket Je of the engine E is constructed, as shown in FIG. 1, of a lower jacket 36, which is so formed in the cylinder block 1 as to enclose the cylinders 2 in each of the cylinder banks $C_1$ and $C_2$, and an upper jacket 37 which is formed in each cylinder head 3. The upper jacket 37 is made to communicate with the lower jacket 36 through a communication hole 38, which extends through the joint surfaces of the cylinder block 1 and the cylinder heads 3, and is composed of a downstream portion 37b, which encloses the main and auxiliary intake ports 10 and 11, and an upstream portion 37a which encloses the exhaust ports 14 and the ignition plugs 16, etc. Although not shown in FIG. 1, the aforementioned inlet Jei of the water jacket Je is disposed at a lower portion of the lower jacket 36. The upper jacket 37 is made to communicate with the outlet Jeo, which is opened in the horizontal surface 1a of the cylinder block 1, through a passage 39 which returns therefrom to an upper portion of the cylinder block 1. Moreover, that outlet Jeo directly communicates with that inlet Jmi of the water jacket Jm, which is opened in the lower surface of the intake manifold M. As a result, the coolant pumped out of the pump P first enters the lower jacket 36 thereby to cool down the surroundings of the cylinders 2. After that, the coolant flows through the communication hole 28 into the upper jacket 37, in which it flows through the upstream portion 37a thereof to cool down the surroundings of the exhaust valves 15 and the ignition plugs 16, and then into the downstream portion 37b thereof to warm up the surroundings of the main and auxiliary intake ports 10 and 11. After that, the coolant sequentially flows through the passage 39 and the outlet and inlet Jeo and Jmi until it flows into the water jacket Jm of the intake manifold M. The water jacket Jm of the intake manifold M is positioned above the upper jacket 37 in the cylinder heads 3 so that any bubble is instantly introduced, even if it is generated in said upper jacket 37, into the water jacket Jm, whereby it is prevented from remaining in that upper jacket 37.

More specifically, as shown in FIGS. 2 and 3, the outlet Jeo of the water jacket Je and the inlet Jmi of the water jacket Jm are respectively formed to have flattened cross-sections such that three of them at the side of the lefthand cylinder bank $C_1$ are arranged at the lefthand side of the respective joint surfaces between the cylinder block 1 and the intake manifold M, whereas three of them at the side of the righthand cylinder bank $C_1$ are arranged at the righthand side of the respective joint surfaces of the same.

The water jacket Jm of the intake manifold M is composed, as shown in FIGS. 3 and 5, of a pair of right and left side jackets 40, which extend in the longitudinal direction while interposing the lower sub-chamber 21b of the main distribution chamber 21 in between. A pair of lower jackets 41 which also extend in the longitudinal direction just below the main distribution chamber 21, interpose the exhaust recirculation passage 30 in between and which has communication with the corresponding side jackets 40 through a communication hole 43. A collecting jacket 42 (FIGS. 4 and 6) is disposed at the rear of the main distribution chamber 21 in a manner to communicate with all of the right and left, and side and lower jackets 40 and 41. The aforementioned inlet Jmi is opened in the lower surface of each of the upper jackets 40. On the other hand, the side jackets 40 at each of the right and left sides are made, as shown in FIG. 7, to communicate with each other around the main branch passages 24 through the upper jacket 44. The collecting jacket 42 is formed, as shown in FIG. 8, with an annular jacket 42a which encloses the upstream portion 30a of the exhaust recirculation passage 30 and which extends adjacent to the bottom wall of the primary auxiliary distribution chamber 22 and the side wall of the lower sub-chamber 21b of the main distribution chamber 21. As shown in FIGS. 4 and 8, the aforementioned outlet Jmo is formed in an upper portion of the collecting jacket 42, and the aforementioned thermostat T is mounted on the outlet Jmo.

Turning to FIG. 4, the aforementioned temperature sensitive switch Sf and coolant temperature sensor S are so mounted in mounting holes 45 and 46, respectively, which are formed in the rear end surface of the intake manifold M, that they can sense the coolant temperature in the aforementioned collecting jacket 42. From the same rear end surface, there protrude connecting pipes $47_1$ and $47_2$ which provide connections to the respective upstream ends of the aforementioned first and second bypass passages 35₁ and 35₂. Incidentally, numeral 48 indicates an air bleeder mounting bore.

Thus, the hot coolant flows into the right and left side jackets 40 and the upper jackets 44, after it has cooled down the engine E and passed into the respective inlets Jmi of the water jacket Jm of the intake manifold M, and further flows through the communication hole 43 into the lower jacket 41 at the same side. The hot coolant streams thus having entered the respective jackets 40, 44 and 41 respectively flow into the collecting jacket 42, during which they warm up both the upper and lower sub-chambers 21a,b of the main distribution chamber 21, the primary and secondary auxiliary distribution chamber 22, 22' and the main branch passages 24, thereby to promote the atomization of the mixtures flowing therethrough. The streams cool down the intermediate portion 30b of the exhaust recirculation passage 30 thereby to lower the temperature of the exhaust gas flowing therethrough. At this time, they warm up both the lower sub-chamber 21b of the main distribution chamber 21 and the lower wall of the primary auxiliary distribution chamber 22 through the annular jacket 42a, while cooling down the upstream portion 30a of the exhaust recirculation passage 30, to promote the atomization of the main and auxiliary mixtures flowing therethrough. They cool down the upstream portion 30a of the exhaust recirculation passage 30 thereby to lower the temperature of the exhaust gas flowing therethrough. The main and auxiliary mixtures thus having their atomization promoted are drawn into the main and auxiliary combustion chambers 7 and 8 so that they can be burned to a satisfactory extent. On the contrary, the exhaust gas having its temperature properly dropped will not carbonize the fuel which wets the respective portions of said chamber 21, when the exhaust gas is fed to the main distribution chamber 21.

Incidentally, the present invention can be applied not only to the torch ignition type internal combustion engine having the auxiliary combustion chambers, as has been described hereinbefore, but also to any conventional type engine. In this latter case, the aforementioned intake manifold M can be modified to dispense with the passages which lead from the auxiliary inlets 20 to the auxiliary branch passages 25'. Therefore, the main distribution chamber 21 and the main branch passages 24 in the foregoing embodiment correspond to the distribution chamber and the branch passages of the present invention, respectively.

In short, the present invention can enjoy the following advantages. In this intake manifold structure, the two mixtures from the carburetor can be expanded in the two upper and lower sub-chambers of the main distribution chamber, respectively, to have their atomizations highly promoted. As a result, even if the respective distances from the carburetor to the respective branch passages are different, the mixtures can be uniformly distributed among the respective combustion chambers, and, at the same time, the intake pulsations in the respective combustion chambers can be attenuated in the two upper and lower sub-chambers, so that interferences in the intake mixtures among the respective combustion chambers can be remarkably reduced.

Moreover, as the exhaust gas to be recirculated first flows into the upper sub-chamber of the distribution chamber and then into the lower sub-chamber of the same until it is distributed into the respective branch passages, it is possible to lengthen the residence time of the exhaust gas in the distribution chamber for good mixing the exhaust gas with the mixtures. As a result, the mixtures can be directly warmed up by the heat of the exhaust gas thereby to have their atomization effectively promoted and their uniform distributions among the respective branch passages improved.

Also, the exhaust recirculation passage formed in the intake manifold has a total length sufficient to underlie the bottom wall of the distribution chamber so that it can properly lower the temperature of the exhaust gas flowing through said recirculation passage as to prevent the fuel wetting the distribution chamber from being carbonized. As a result, it is unnecessary to specially elongate the exhaust recirculation pipe, which is arranged around the intake manifold, and to attach radiating fins to the outer circumference of the recirculation pipe so that the intake manifold structure can be made compact as a whole.

As the intermediate portion of the exhaust recirculation passage is arranged just below the distribution chamber and in the longitudinal direction of the engine, i.e., in parallel with the axis of the crankshaft, the exhaust recirculation passage can be easily formed without being obstructed by the plural branch passages leading out of the distribution chamber thereby to improve the functioning of the intake manifold. This effect is prominent especially in the case of the intake manifold of the V-type internal combustion engine in which the plural branch passages lead to the right and left from the distribution chamber.

As the heating water jacket communicating with the cooling water jacket in the cylinder block is formed in the intake manifold and adjacent to the distribution chamber and the exhaust recirculation passage, the warming operation of the distribution chamber and the cooling operation of the exhaust recirculation passage can be simultaneously effected by the coolant circulating in the engine. The water jacket is disposed at each of the right and left sides of the exhaust recirculation passage so that the cooling area of this passage can be enlarged to promote the cooling operation of said passage more effectively.

Furthermore, the V-type multi-cylinder internal combustion engine, in which each of the cylinders is equipped with the main and auxiliary combustion chambers, is constructed such that the primary auxiliary distribution chamber is arranged at one side of the longitudinal direction of the main distribution chamber, the paired secondary auxiliary distribution chambers are arranged at the opposite sides of the main distribution chamber, and the plural secondary auxiliary branch passages are led out of the respective secondary auxiliary distribution chambers, therefore the auxiliary mixture from the carburetor is first divided at the primary auxiliary distribution chamber into two halves for both the cylinder banks, and fed to the secondary auxiliary distribution chambers. As a result, the distribution passages of the auxiliary mixture are made generally bisymmetrical without being obstructed by the main distribution chamber so that the auxiliary mixture can be uniformly distributed into the auxiliary combustion chambers of the right and left cylinder banks.

Furthermore, since the secondary auxiliary distribution chambers are provided for the respective cylinder rows, the interference in the intake air among the auxiliary combustion chambers of the right and left cylinder banks can be prevented to exert excellent influences upon the uniform distribution of the auxiliary mixture.

Since a water jacket is disposed close to the bottom wall of the auxiliary distribution chamber and/or the auxiliary branch passages, the auxiliary mixture can be atomized and uniformly distributed among the respective auxiliary combustion chambers. Moreover, as the aforementioned water jacket is positioned close to the main distribution chamber or the main branch passages, too, the main and auxiliary mixtures can be warmed up by the common water jacket so that the intake manifold structure can be made compact, without being necessary to construct the water jacket of two main and auxiliary systems.

Furthermore, since the coolant, which has cooled down the cylinder block of the engine, is wholly introduced into the heating jacket of the intake manifold, the heat of the engine coolant can be fully utilized to warm up the intake manifold to effectively promote the atomization of the mixture flowing through the intake manifold.

Since, in this case, the intake manifold is jointed to the upper surface of the cylinder block such that the outlet of the cooling water jacket of the cylinder block is made to directly communicate with the inlet of the water jacket of the intake manifold, the coolant can have its temperature maintained while it is flowing from the cylinder block to the intake manifold so that its heat can be efficiently utilized to warm up the intake manifold. Moreover, since all the cylinder block, the intake manifold, the radiator and the coolant pump are connected through a series of the circulation passages, it is possible to attain other beneficial effects. Thus, the coolant passages can have their constructions so remarkably simplied that they can be constructed at low cost. Also the flow of the coolant is smoothed to reduce the load upon the coolant pump.

Furthermore, the thermostat is mounted in the outlet of the heating water jacket of the intake manifold, and said jacket and the pump are connected through the bypass passage so that the aforementioned thermostat is opened and closed in accordance with the coolant temperature in the intake manifold. As a result, when the intake manifold is at a low temperature, its communicating relationship with the radiator is interrupted so that it can be quickly warmed up. At a high temperature, on the contrary, the intake manifold restores its communicating relationship with the radiator so that it can be held at a proper temperature level thereby to ensure the proper mixture charging efficiency of the engine. The distribution chamber is so enclosed by the upper and lower water jackets that it can have a wide heat receiving area. As a result, the distribution chamber can be effectively warmed up with the water jacket having a relatively small capacity so that atomization of the mixtures and uniform distributions among the respective intake ports can be promoted.

Since the heating water jacket of the intake manifold is made to communicate with the cooling water jacket in the cylinder head by means of the communication passage formed in the cylinder block, it is sufficient that the joint surfaces between the cylinder heads and the intake manifold are so formed that the intake ports extending therethrough are connected in air-tight fashion. As a result, the joint surfaces need not be constructed for full air-tightness, and so as to be formed more easily than the case in which the communication passage is formed between the water jackets of the intake manifold and the cylinder head.

What is claimed is:

1. An intake manifold structure for an internal combustion engine, comprising:
   (a) a distribution plenum chamber divided by a partition wall into a vertical first sub-chamber and a horizontal second sub-chamber,
   (b) inlet opening means formed in a top wall portion of the first sub-chamber for introducing an air-fuel mixture,
   (c) a communication passage formed through the partition wall and having a cross-sectional area larger that the total cross-sectional area of said inlet opening means and smaller than the cross-sectional area in the direction of air-fuel mixture flow of each of said first and second sub-chambers,
   (d) a plurality of intake branch passages extending laterally from the side wall of the second sub-chamber, and
   (e) a water jacket means underlying a substantial portion of said distribution plenum chamber and surrounding a substantial portion of an upper portion of said distribution plenum chamber.

2. An intake manifold structure as set forth in claim 1, further comprising an annular protruding edge formed at the lower end of said communication passage and protruding into said second sub-chamber.

3. An intake manifold structure as set forth in claim 1, wherein said inlet opening means comprises primary and secondary inlet openings, and said primary inlet opening and said communication passage are generally coaxially arranged.

4. An intake manifold structure as set forth in claim 1, wherein said inlet opening means comprises primary and secondary inlet openings, and said secondary inlet opening and said communication passage are generally coaxially arranged.

5. An intake manifold structure as set forth in claim 1, wherein said inlet opening means comprises primary and secondary inlet openings which are arranged in the axial direction of the crankshaft of the internal combustion engine.

6. An intake manifold structure as set forth in claim 1, wherein said intake manifold structure is mounted on a V-type internal combustion engine having combustion chambers disposed along opposite sides of a longitudinal centerline; and said inlet opening means comprises primary and secondary inlet openings which are disposed along a longitudinal centerline of the intake manifold structure.

7. An intake manifold structure as set forth in claim 1, wherein said intake manifold structure is mounted on a V-type internal combustion engine having combustion chambers disposed along opposite sides of a longitudinal centerline and sdid distribution plenum chamber is disposed along a longitudinal centerline of the intake manifold structure and wherein said intake manifold structure further comprises means for receiving an exhaust gas recirculation valve disposed at one longitudinal end of the intake manifold and spaced from said distribution chamber, and an exhaust gas recirculation passage extending from said valve receiving means to said inlet opening means, said exhaust gas recirculation passage including an intermediate portion longitudinally underlying the bottom wall of said distribution chamber, an upstream portion extending upward from one end of said intermediate portion to said valve receiving means, and a downstream portion extending upward from the other end of said intermediate portion and opening into said inlet opening means, said water jacket being disposed adjacent to said exhaust gas recirculation passage and connected to a coolant passage of the engine.

8. An intake manifold structure as set forth in claim 1, wherein said inlet opening means has a smaller cross-sectional area than said first sub-chamber.

9. An intake manifold structure as set forth in claim 1, further comprising an exhaust gas recirculation passage having an outlet port provided in said first sub-chamber.

10. An intake manifold structure as set forth in claim 9, further comprising a baffle plate disposed in said first sub-chamber at a position to face the outlet port of said exhaust recirculation passage.

11. An intake manifold structure as set forth in claim 1, wherein said intake manifold structure is mounted on a V-type internal combustion engine having combustion chambers disposed along opposite sides of a longitudinal centerline, each of said combustion chambers including a main combustion chamber, an auxiliary combustion chamber and a torch nozzle establishing communication between these main and auxiliary combustion chambers, wherein said distribution plenum chamber is disposed along a longitudinal centerline of the intake manifold structure and said intake branch passages are associated with the respective main combustion chambers, and wherein the intake manifold structure further comprises: a primary auxiliary distribution plenum chamber disposed horizontally at one longitudinal side of said distribution plenum chamber; an auxiliary inlet opening vertically rising from said primary auxiliary distribution plenum chamber; a pair of secondary auxiliary distribution chambers disposed horizontally at opposite sides of said distribution plenum chamber; a pair of primary auxiliary branch passages connecting said primary and secondary auxiliary distribution chambers, respectively; and a plurality of secondary auxiliary intake branch passages extending laterally from said secondary auxiliary distribution chambers and associated with the respective auxiliary combustion chambers.

12. An intake manifold structure as set forth in claim 11, wherein said water jacket extends below the bottom wall of at least one of said auxiliary distribution chambers.

13. An intake manifold structure as set forth in claim 1, wherein said intake manifold structure is mounted on a V-type internal combustion engine having chambers disposed along opposite sides of a longitudinal centerline, said distribution plenum chamber is disposed along a longitudinal centerline of the intake manifold structure, said water jacket is provided at spaced locations with inlet openings and at an upper wall portion of the intake manifold structure with an outlet opening for engine coolant, and said outlet opening means has a mounting base for a thermo-control valve which controls a flow of coolant from said water jacket to a radiator, whereby the engine coolant enters the water jacket through the inlet opening and leaves it through the thermo-control valve while heating the distribution chamber by way of its bottom wall.

14. An intake manifold structure as set forth in claim 13, wherein said water jacket includes upper jackets surrounding side walls of said distribution chamber and upstream portions of said intake branch passages and bottom jackets underlying said distribution chamber, said upper water jackets communicating with said bottom water jackets through communication holes.

15. An intake manifold structure as set forth in claim 1, wherein said intake manifold structure is mounted on an internal combustion engine having main combustion chambers to be supplied with a relatively lean air-fuel mixture and having auxiliary combustion chambers adapted to be supplied with a relatively rich air-fuel mixture, and torch nozzles connecting the main and auxiliary combustion chambers, said distribution plenum chamber being adapted to receive a relatively lean air-fuel mixture, said intake manifold structure further comprising an auxiliary distribution chamber adapted to receive a relatively rich air-fuel mixture, passage means for carrying hot exhaust gas from the engine into the first sub-chamber, means for supplying lean mixture from the distribution chamber to the main combustion chamber, means for supplying rich mixture from the auxiliary distribution chamber to the auxiliary combustion chambers, and coolant passages in the intake manifold structure constituting said water jacket for cooling the exhaust gas entering the first sub-chamber and for heating the rich mixture in the auxiliary distribution chamber.

16. An intake manifold structure as set forth in claim 15 in which said communication passage between said sub-chambers is provided with a downward extending peripheral lip in the second sub-chamber.

17. An intake manifold structure as set forth in claim 1, wherein said intake manifold structure is mounted on a V-type internal combustion engine having combustion chambers disposed along opposite sides of a longitudinal centerline and, comprising:
(a) a pair of cylinder blocks including cylinders and water jackets surrounding the cylinders,
(b) a pair of cylinder heads joined to the upper surfaces of said cylinder blocks, respectively, and each including combustion chamber, intake and exhaust ports connecting to said combustion chamber, intake and exhaust valve cooperating with said ports, and a water jacket surrounding the upper wall of said combustion chamber and said ports,
(c) each water jacket of said cylinder block and head having holes for connecting said jackets with each other,
(d) said intake manifold structure being mounted on said cylinder blocks and having a coolant passage in communication with a radiator by way of a thermo-control valve disposed on the intake manifold structure,
(e) a connecting coolant passage disposed in said cylinder blocks and connecting said water jackets in the cylinder heads with said coolant passage in the intake manifold structure,
whereby substantially all of the coolant introduced into the water jackets in the cylinder heads and blocks flows into the coolant passage in the intake manifold and leaves it through the thermo-control valve.

18. An intake manifold structure as set forth in claim 17, wherein said water jackets in the cylinder heads of the V-type engine are positioned substantially lower than said coolant passage in the intake manifold.

19. An intake manifold structure as set forth in claim 17, wherein said water jacket in each of the cylinder heads of the V-type engine has an upstream portion disposed close to said exhaust ports and a downstream portion disposed close to said intake ports, said connecting coolant passage being connected to said downstream portion.

20. An intake manifold structure for conducting an air-fuel mixture from a carburetor to the intake ports of an internal combustion engine, comprising, an air-fuel mixture distribution chamber having a partition wall dividing said chamber into a first sub-chamber and a second sub-chamber, said first sub-chamber having a carburetor mounting wall with inlet opening means, said partition wall having a communication passage formed therethrough, said partition wall communication passage having a cross-sectional area larger than the total cross-sectional area of said inlet opening means and smaller than the cross-sectional area in the direction of air-fuel mixture flow of each of said first and second sub-chambers for causing expansion of the mixture in each of said sub-chambers without restriction in flow area from said inlet opening means through said partition wall communication passage, and a separate branch passage extending from the second sub-chamber to each engine intake port.

21. An intake manifold structure as set forth in claim 20, wherein the cross-sectional area in the direction of mixture flow is larger in said second sub-chamber than said first sub-chamber.

22. An intake manifold structure as set forth in claim 20, wherein a water jacket is provided underlying a substantial portion of said second sub-chamber and surrounding upper portions of said mixture distribution chamber for receiving hot coolant from the engine for heating said chamber to enhance evaporation of the fuel therein.

23. An intake manifold as set forth in claim 22, wherein exhaust gas recirculation passages are formed therein underlying said second sub-chamber for heating same and adjacent said water jacket for cooling the exhaust gases, and means connecting said exhaust gas recirculation passages to said first chamber for adding the cooled exhaust gases to said air-fuel mixture.

24. An intake manifold structure for an internal combustion engine, comprising:
(a) a distribution plenum chamber divided by a partition wall into a first sub-chamber means and a second sub-chamber means,
(b) inlet opening means formed in a wall portion of the first sub-chamber means and constituting the sole inlet means for introducing an air-fuel mixture into said plenum chamber,
(c) communication passage means formed through the partition wall to interconnect said first and second sub-chamber means and having a cross-sectional area larger than the cross-sectional area of said inlet opening means, and
(d) a plurality of intake branch passages extending laterally from the side wall of the second sub-chamber means.

25. An intake manifold structure as set forth in claim 24, further including a water jacket underlying a substantial portion of said second sub-chamber means and surrounding upper portions of said plenum chamber for receiving hot coolant from the engine for heating said plenum chamber to enhance evaporation of the fuel therein, means forming exhaust gas recirculation passages underlying said second sub-chamber means for heating same while being located adjacent said water jacket for cooling the exhaust gases, and means connecting said exhaust gas recirculation passages to said first chamber means for introducing cooled exhaust gases to said first sub-chamber means.

* * * * *